INVENTOR

ALBERT L. EUSTICE

BY

ATTORNEY

United States Patent Office 3,646,158
Patented Feb. 29, 1972

3,646,158
FILM OF POLYURETHANE AND ETHYLENE-
ACRYLIC ACID INTERPOLYMER
Albert L. Eustice, Wilmington, Del., assignor to E. I. du
Pont de Nemours and Company, Wilmington, Del.
Original application Apr. 2, 1968, Ser. No. 718,043.
Divided and this application Nov. 12, 1970, Ser. No.
88,856
Int. Cl. C08g 41/04
U.S. Cl. 260—859 R            4 Claims

ABSTRACT OF THE DISCLOSURE

A film is provided which comprises a dispersion of pre-cured polyurethane in acidic copolymer having its main polymer chain saturated and of carbon atoms, a portion of which are substituted with an adhesively effective amount of carboxylic acid groups. The film can be used as an interlayer between a base panel and a constraining sheet to form a constrained layer damped structure, with the acidic copolymer serving to adhere the film to the panel and the sheet.

This application is a division of copending application Ser. No. 718,043, filed Apr. 2, 1968, by the same inventor.

This invention relates to interlayers used to form constrained layer damped structures and for general adhesive application.

Numerous materials have been used as the interlayer in constrained layer damped structures. These materials, however, suffer from one or more of the disadvantages of having low tensile and shear strength, low strength of the adhesive bond, excessive creep, poor low temperature properties, sensitivity to water, and low modulus, and of requiring separate adhesive systems for securing the interlayer to the other layers of the constrained layer damped structure.

In one embodiment, the present invention provides an interlayer which has both good physical properties and water resistance as well as vibration damping characteristics and which does not require a separate adhesive system to form constrained layer damped structures. The interlayer is comprised of a dispersion of visco-elastic polymer having a loss tangent of at least 0.5 in a continuous phase of an acidic copolymer of ethylene and from 5 to 25 percent by weight of an alpha-beta monoethylenically unsaturated carboxylic acid, with the carboxylic acid groups being neutralized from 0 to 50 percent by metal ions.

In another embodiment, when the visco-elastic polymer phase of the interlayer is pre-cured polyurethane, and from 10 to 80 percent by weight thereof based on the total weight of polymer in the interlayer is present, the peel strength of the interlayer is increased over the peel strength using acidic copolymer alone. The interlayer of this embodiment thus finds use both in constrained layer damping applications and as an adhesive in systems where constrained layer damping is not required.

In still another embodiment of the invention, constrained layer damping is obtained with an interlayer composed of a laminate construction of a layer of visco-elastic polymer sandwiched between films of acidic polymer.

These and other embodiments of the invention will be discussed more fully hereinafter with reference to the accompanying drawing, in which.

Figure 1:
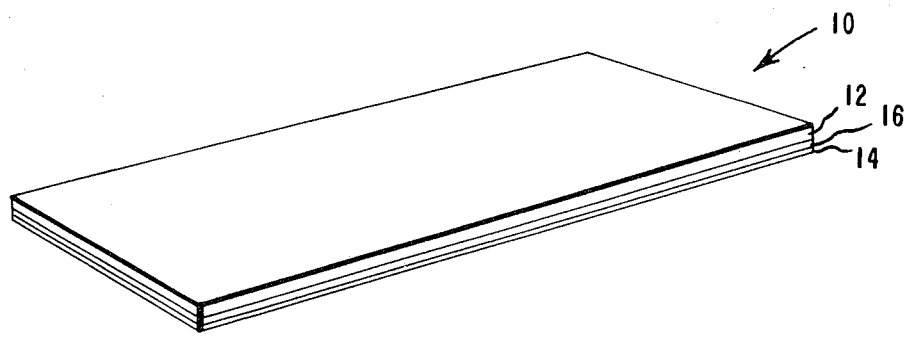
FIG. 1 depicts in perspective view a typical constrained layer damped structure incorporating an interlayer of the present invention.

With reference to the drawings, FIG. 1 shows a constrained layer vibration damped structure 10 consisting of a base panel 12, a constraining sheet 14, and an interlayer 16 of the present invention. The base panel 12 is a high modulus material, generally a metal, and is of a thickness so as to be susceptible to deformation and vibration upon the application of a force. In accordance with conventional constrained layer damping practice, however, the interlayer 16 and the constraining layer 14 coact with the base panel 12 to damp the vibration which would normally be set up in the base panel. One embodiment of the present invention resides in the particular interlayer 16 employed in constrained layer damped structures such as structure 10.

Figure 2:
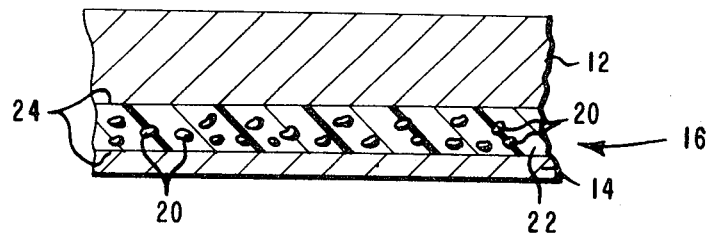
FIG. 2 is an enlarged cross-sectional view of a portion of the structure of FIG. 1.

As shown in FIG. 2, the interlayer 16, which is sometimes called the constrained layer, consists of dispersed particles 20 of visco-elastic polymer in a continuous phase 22 which is composed of acidic copolymer.

In greater detail, the acidic copolymer can be further described as comprising a main polymer which is saturated and consists essentially of carbon atoms, a portion of which are substituted with a sufficient amount of carboxylic acid groups to provide the adhesive effect desired. Other substituents may be present on the chain carbon atoms so long as they do not adversely affect adhesion; generally such other substituents will be hydrogen or hydrocarbon, e.g., alkyl. Preferably, the copolymer is a copolymer of ethylene with from 5 to 25 percent by weight of an alpha-beta monoethylenically unsaturated carboxylic acid, which can be made by grafting but preferably by copolymerizing the ethylene and the carboxylic acid, preferably following the procedure of British Pat. No. 963,380 to give a copolymer in which the acid derived units are randomly distributed along the copolymer chain. The carboxylic acid monomer need not be in the acid form, but can be in a form, e.g., the metal salt or ester of the unsaturated acid, which yields the acid function in the copolymer chain. Preferably, the carboxylic acid has from 3 to 8 carbon atoms. Suitable acids include the mono- and di-carboxylic acids, including compounds convertible thereto in the copolymer chain, such as acrylic, methacrylic, maleic and fumaric acids and the monoalkyl esters thereof and maleic anhydride. The preferred copolymer is of ethylene with from 2 to 10 mole percent of acrylic or methacrylic acid. The acidic copolymer is not limited to the ethylene and acid monomer components described; other ethylenically unsaturated copolymerizable monomers which do not adversely affect the adhesive function or strength properties can be present in small amounts, such as the third monomers described in U.S. Pat. No. 3,201,374 to Sims.

Also included in the acidic copolymers which are useful in forming the continuous phase 22 (FIG. 2) are the acidic copolymers just described in which up to about 50 percent of the carboxylic acid groups have been neutralized by metal ions. Such a partially neutralized copolymer can be referred to as an ionomer, which is further described in U.S. Pat. No. 3,264,272 to Rees. As in the case of the unneutralized acidic copolymers just described, small amounts of monomers, other than ethylene and the carboxylic acid, can be present, such as described in U.S. Pat. No. 3,264,272, with due regard for preserving the strength and adhesion of the two component copolymer. The metal ions used to obtain this neutralization and ionic cross-linking will generally have a valence of 1 to 3 inclusive and will fall in Groups I (A and B) and II (A and B) and the transition elements of the Periodic Table.

Preferred metals include calcium, magnesium, zinc and sodium. If the acidic copolymer forming phase 22 is to be in the ionomer form, then generally at least 10 percent of the carboxylic acid groups will be neutralized with the metals hereinbefore described.

The acidic copolymer forming phase 22 will generally have sufficient molecular weight to have a melt index of 100 or less. Generally the use of a copolymer having a melt index of less than 0.1 is not necessary. When the acid copolymer is an ionomer, the melt index is preferably from 0.5 to 5.0. The melt indices herein recited are determined by the procedures set forth in ASTM D 1238–62T.

The visco-elastic polymer of which dispersed particles 20 are composed can be of any polymer which is of high molecular weight and which possesses both viscous properties and elastic properties, and more specifically a loss tangent of at least 0.5. Loss tangent is the ratio of viscous modulus to elastic modulus and is measured by means of a torsion pendulum apparatus as described in ASTM D 2236–64T.

The loss tangent is only to a certain extent an inherent characteristic of the visco-elastic polymer. This property is also affected to a high degree by the temperature at which the polymer is used for damping and to a lesser extent by the frequency of vibration applied to the base panel. Thus, the minimum of 0.5 loss tangent desired for the visco-elastic polymer component of interlayer 16 is specified with reference to the conditions (temperature and frequency) encountered in service. Generally, but not necessarily, the service temperature will be from −20 to +80° C. and the frequency will be from 20 to 20,000 cps. Often the service temperature will be room temperature (25° C.) and the frequency range will be from 100 to 10,000 cps.

Most of the vibration damping in the constrained layer application according to the present invention occurs by deformation of the dispersed phase of particles 20. While the phase 22 may also contribute in this respect, its primary function is to transmit the energy applied to the base panel 12 to the particles 20 in order that the latter may deform and achieve vibration damping of the constrained layer structure. Any contribution which the acidic copolymer makes to the damping is due to its own visco-elastic behavior, but since its loss tangent is less than 0.5, it is not considered to be a visco-elastic material in the present invention. In order for the acidic copolymer to transmit energy to the particles 20 for deformation purposes, the acidic copolymer must be stiffer, i.e., have a higher elastic modulus than the visco-elastic polymer, generally at least 200 percent greater and preferably at least 500 percent greater.

The continuous phase 22 of acidic copolymer has the additional role of serving as the adhesive thereby making the interlayer 16 self-adherent, for anchoring the interlayer to the base panel 12 and the constraining layer 14 at their interface surfaces 24. The adhesive effect is obtained by heating at least the interface surfaces to a temperature above the melting point of the particular acidic copolymer employed and thereafter assembling the constrained layer damped structure or carrying out the heating after assembly. Sufficient pressure is applied to the structure to maintain the interface surfaces in contact with one another during heating and cooling. No additional adhesive is necessary. Generally, the heating is carried out to at least 25° C. above the melting point of the acidic copolymer phase and preferably at least 50° C. above.

The adhesive effect exhibited by the acidic copolymer with respect to the panel 12 and constraining layer 14 is also believed to be present at the interface between the continuous phase 22 and the particles 20, which makes these particles deformatively responsive to force applied to the continuous phase 22 via the base panel 12.

Representative visco-elastic polymers which have the loss tangent and stiffness desired for particular service conditions and acidic copolymer phase include the natural rubbers and the synthetic rubbers, cured or uncured in either case. Specific examples are the ethylene rubbers, e.g., ethylene/propylene copolymers and ethylene/vinyl acetate, ethylene/ethyl acrylate, ethylene/methyl methacrylate copolymers; SBR (butadiene/styrene copolymer); polyisobutylene; polybutadiene; polyisoprene; butyl rubber; chloroprene polymer and copolymers commonly known as neoprene; chlorosulfonated polyethylene, nitrile rubber (butadiene/acrylonitrile copolymers), and butadiene/styrene or acrylonitrile/methacrylic acid copolymers; silicone rubbers and the polyurethanes. The ethylene/propylene copolymers can consist solely of ethylene and propylene or can contain additional comonomers, such as do the copolymers described in U.S. Pat. No. 2,933,480 to Gresham, U.S. Pat. No. 3,093,620 to Gladding and Robinson, U.S. Pat. No. 3,093,621 to Gladding, U.S. Pat. No. 3,000,855 to Tarney, and U.S. Pat. No. 3,211,709 to Adamek et al. In each of the copolymers described in these patents, a small amount of copolymer units derived from a third monomer are present for the purpose of supplying sulphur curability to the saturated hydrocarbon chain of the polymer. This particular class of copolymers, sometimes referred to as the EPDM rubbers need not necessarily be cured, but can be cured, if desired, by conventional procedures, such as incorporating the known curing agents for the respective polymer into the visco-elastic polymer prior to fabrication into the interlayer 12 and then curing the polymer after fabrication into the interlayer. Instead of post-curing, the visco-elastic polymer can be pre-cured and broken up into smaller particles by shredding or granulating in conventional plastics processing equipment. Grinding, generally at low temperatures, can also be employed to get even smaller particle sizes. The particles obtained by shredding or granulation, however, can be further reduced in size by the high shear action in the step of compounding the particles with the acidic copolymer forming phase 22.

Particularly useful visco-elastic polymers are the polyurethane compositions disclosed in U.S. Pat. application Ser. No. 409,842, filed Nov. 9, 1964, by Ahramjian and Yin, now U.S. Pat. No. 3,467,522 prepared in accordance with the criteria set forth therein. As stated therein, the polyurethane compositions are related to the parameters of temperature (T, ° C.) and frequency (f, cycles per second) of vibration by the formula $$W = -A\left(\log_{10} f - \frac{T-25}{10}\right) + B$$

wherein A is from 4 to 7 and B is from 40 to 70 (neither A nor B need be an integer) and wherein W is the amount in parts by weight of an aromatic diisocyanate of molecular weight up to about 300 to react with (1) 100 parts by weight of polypropyleneether glycol having a number average molecular weight between 750 and 2500, preferably between 900 and 1100, and (2) an amount in parts by weight of low molecular weight, preferably less than 350 and usually less than 200, aliphatic diol or triol sufficient to react with 70 to 100 percent of the NCO groups in excess of those required to form a bis-urethane from each molecule of said polypropylene-ether glycol.

The optimum values of A and B for some of the typical and preferred aromatic diisocyanates are as follows:

| Diisocyanate: | A | B |
|---|---|---|
| Toluene diisocyanate | 5.5 | 55 |
| Ring-dichlorinated toluene diisocyanate | 6.8 | 66 |
| Methylene bis(4-phenylisocyanate) | 6.6 | 62 |
| Naphthylene diisocyanate | 4.5 | 53 |
| Paraphenylene diisocyanate | 5.0 | 44 |

For these diisocyanates as well as others within the scope of this invention, the values for A and B can fall anywhere within the respective ranges given.

The selection of the polyol component should be such that the production of crystalline polyurethanes as evidenced by opacity and unduly high hardness is avoided. Such polyurethanes are too hard and resilient for efficient use in constrained layer vibration damping applications. In other words, the low molecular weight glycol should be chosen to yield a polyurethane which is "clear"; this desired characteristic provides an easy test for determining whether or not a particular diol or triol is suitable. The preferred diols are 1,3-propanediol, neopentyl glycol, and 2-methyl-2-ethyl-1,3-propanediol. Triols, such as trimethylolpropane and 1,2,6-hexanetriol, may be substituted for part of the diols. With the preferred diols listed above, an appropriate level of triol corresponds to that amount capable of reacting with 0 to 45 percent of the available isocyanate (excess of NCO groups over polyether glycol hydroxyl groups). The reaction of these components to polyurethanes is described in the Ahramjian and Yin patent application. These polyurethanes are of the cured variety and thus can be considered to be pre-cured insofar as blending with acidic copolymer is concerned. Accordingly, these polyurethanes are comminuted to the particle size desired and then compounded with the acidic copolymer.

The temperature and/or frequency range of effective use of constrained layer damped structures according to the present invention can be expanded by having the dispersed phase of particles 20 be made of a plurality of visco-elastic polymers, each having different vibration damping characteristics at any given set of conditions. For example, the constrained layer damped structure may be used in the full range of —20 to +80° C. To insure that the interlayer acts as though the visco-elastic polymer always has a loss tangent of at least 0.5, some of the particles 20 would be of polymer having at least this loss tangent at about —20° C. and other of the particles 20 would be of a different polymer having at least this loss tangent at about +80° C. and particles 20 of still other visco-elastic polymer having their maximum loss tangent at intermediate service temperatures can be present. Instead of using different visco-elastic polymers for this purpose, a single polymer can be used but with the particles 20 thereof being of varying molecular weight and/or degree of cure, if any, to obtain the spread in good vibration damping character over a range of service conditions.

The relative amounts of visco-elastic polymer and acidic copolymer in the interlayer will depend on several factors. If the visco-elastic polymer is cured prior to mixing with the acidic copolymer, then it is possible to have the interlayer consist of as much as 80 percent by weight, based on the total weight of polymer in the interlayer, of visco-elastic polymer while still retaining the acidic copolymer as a continuous phase. If, however, the visco-elastic polymer is not pre-cured (i.e., is thermoplastic) then generally no greater than 50 percent by weight of the interalyer (polymer basis) is visco-elastic polymer. The sizes of particles 20 should be small enough to lie within whatever thickness the continuous phase 22 that is employed. The particles can be in such forms as granules, flakes and/or fibers.

With respect to the minimum amount of visco-elastic polymer to be used in the interlayer, this will depend on the amount of improvement in vibration damping desired over the use of an interlayer made only of acidic copolymer. Generally, however, at least 10 percent by weight of visco-elastic polymer based on the total weight of polymer in the interlayer, is present as a dispersed phase. Expressed differently, it is generally desired to have sufficient visco-elastic polymer present to provide an increase of at least 0.5 in the percent critical damping of the constrained layer structure over the percent critical damping obtained under the same conditions for the same structure having the same thickness of acidic copolymer present as the sole component of the interlayer. The percent critical damping (100 C/Co) of a simple or composite structure can be calculated from the decay rate of resonant vibration or peak width at forced resonance as described in "Damping Capacity—Its Measurement and Significance," U.S. Bureau of Mines Report of Investigations No. 5441, by J. W. Jensen (1959). Measurements for this purpose can be made with the Bruel and Kjaer Complex Modulus Apparatus, Type 3930. Since percent critical damping is a ratio of logarithmic values, the 0.5 percent minimum improvement desired represents at least a three-fold improvement in vibration damping performance over the use of acidic copolymer alone. Constrained layer damped structure having a percent critical damping of at least 2 at 25° C. at an interlayer thickness between 3 and 25 mils are readily obtainable with interlayers of the present invention.

The interlayers hereinbefore described in detail can be prepared by such methods as dry blending the interlayer components together and thereafter converting the dry blend to forms more useful for forming the interlayer, such as melt fabrication by extrusion casting or otherwise into films or preparation of the blend in a liquid vehicle. The film is placed between the base panel and the constraining layer and heated to adhere to the base panel and constraining layer, to form the constrained layer damped structure. In the case of the blend contained in a liquid vehicle, e.g., such as a dispersion, this can be brushed, dipped or otherwise applied to the surface of the base panel, and the liquid vehicle thereatfer evaporated, followed by bringing the constraining layer into contact with the exposed surface of the resultant blend coating, followed by the heating hereinbefore described.

Filler can be added to either the dispersed polymer phase or to the continuous polymer phase. Filler can be added to the dispersed polymer phase before curing to the extent of 50–100 parts per 100 parts of visco-elastic polymer where there may be need to impart special properties, such as increased stiffness, improved tensile strength, improved weatherability, increased viscosity during fabrication. Filler added to the continuous adhesive phase should generally not exceed 50 parts per 100 parts of acidic copolymer. The presence of fillers in the continuous adhesive phase will have similar effects to that noted above. High filler loadings in the continuous phase tend to decrease adhesion level. Representative fillers that may be used include carbon, talc, clays, calcium carbonate, calcium silicate, mica, silica, glass and antimony oxide. Other additives may be present, such as for the purpose of stabilizing or otherwise modifying the polymer components of the interlayer.

The constrained layer damped structures made according to the present invention are useful such as in the manner of previously known constrained layer damped structures; for example, as forming parts of or in the entirety, walls, vehicle bodies, machinery housings, metal furniture, appliances, etc.

For purposes of illustration, constrained layer structures of this invention can be symmetrical with 18 gauge steel (48 mils) on each side of a 10 mil thick interlayer 16. Where special design considerations dictate, the composite construction can be asymmetric with one sheet of 14 gauge (75 mils) and one sheet of 22 gauge (30 mils) on the respective sides of a 3–10 mil interlayer 16. The ratio of thicknesses of the two metal surfaces in such constructions will be determined by design requirements which take into account the structural requirements and vibration damping requirements of the constrained layer damped structure. There will also be instances when special constrained layer damped structures comprising metal in combination with glass, wood, or other high modulus materials in sheet form can be used. In general, aluminum and steel will be the preferred metals for panel 12 and sheet 14. However, there will be instances when damped structures will make use of bronze, copper or stainless steel faces.

The pre-cured polyurethanes when used as the visco-elastic component of the interlayers of this invention, have a surprising effect on the adhesiveness of the interlayer, which can be measured by peel strength, to the base panel and the constraining layer to which it is adhered. More particularly, the peel strength of the interlayer increases with the increase of polyurethane content up to a maximum of about 40 percent by weight, based on the total weight of polymer in the interlayer, followed by decreasing peel strength at higher polyurethane contents. This is surprising since the pre-cured polyurethane by itself has virtually no adhesion for the panel and constraining layer surfaces (i.e., when brought into contact with these surfaces after curing). Generally, this improvement is obtained when the polyurethane particle content comprises 30 to 65 percent of the total weight of polymer in the interlayer.

This surprising effect leads to another embodiment of the present invention wherein the interlayer of the acidic copolymer having pre-cured polyurethane particles dispersed therein is useful as an adhesive having increased peel strength and can therefore be used in systems where adhesion is of primary concern rather than constrained layer damping and wherein the geometry of the stysem is such that little constrained layer damping is obtained. The polyurethanes of the Ahramjian and Yin patent application are the preferred polyurethanes for both the damping and adhesive embodiments; although for the adhesive embodiment, the minimum loss tangent of 0.5 is not required.

Figure 3:
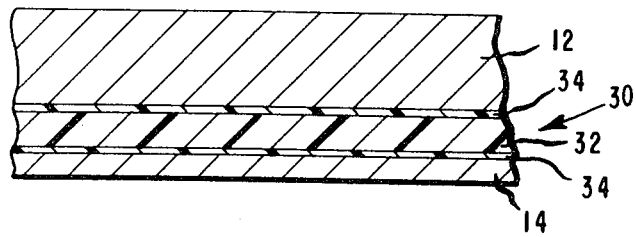
FIG. 3 is an enlarged cross-sectional view of another embodiment of constrained layer damped structure of the present invention.

In still another embodiment, as depicted in FIG. 3, FIG. 3 can be formed in the same manner and using the same degree of heating as described for FIG. 2. The layer 32 and sheet 14 then cooperate with the base panel 12 to give the constrainted layer damping effect.

Examples of the present invention are as follows: parts and percents are by weight unless otherwise indicated.

EXAMPLES 1 TO 21

Various acidic copolymer-visco-elastic polymer interlayer compositions were prepared by blending powders of these components together on a rubber mill at 150° C. for about 10 minutes and by sheeting the blend into film form. The resultant films were hot pressed between steel panel base and a steel constraining layer at 150° C. giving unitary composite constrained layer damped structures, with the acidic copolymer forming the continuous phase of the interlayer. Further details on film (interlayer) composition and on dimensions and damping test results are shown in Table I. The acidic copolymer in these compositions is a copolymer of ethylene and 11 percent methacrylic acid, neutralized to an extent of about 20 percent with zinc ions and having a melt index of 1.5 prepared according to the procedure of U.S. Pat. No. 3,264,272 to Rees. The visco-elastic polymer component of the interlayer composition is given in the table and is uncured unless otherwise indicated. Polyurethane A consists of 3.5 moles toluene diisocyanate, 1.0 mole polypropylene ether glycol (M.W. 1000), 1.87 moles 1,3-butane diol, and 0.25 mole of trimethylolpropane and is prepared according to the procedure of Example 1 of the Ahramjian and Yin patent application.

TABLE I

| Example | Laminate construction, thickness (inches) | | | Interlayer composition, wt. percent (total wt. basis) added visco-elastic polymer in acidic copolymer | Percent critical damping at 25° C. (100 C/Co) |
|---|---|---|---|---|---|
| | Base panel | Constraining layer | Interlayer | | |
| 1 | 0.060 | 0.036 | 0.010 | None | 1.3 |
| 2 | 0.036 | 0.018 | 0.018 | 50% carboxylated butadiene/acrylonitrile copolymer (Hycar 1072). | 2.7 |
| 3 | 0.060 | 0.036 | 0.039 | 50% silicone rubber (SE-76). | 2.7 |
| 4 | 0.036 | 0.018 | 0.018 | 50% * sulfur curable polyurethane (Adiprene C). | 3.4 |
| 5 | 0.036 | 0.018 | 0.050 | 50% polyisoprene (Vistanex-ME). | 5.9 |
| 6 | 0.036 | 0.018 | 0.015 | 10% silicone rubber (SE-76). | 2.7 |
| 7 | 0.036 | 0.018 | 0.023 | 10% chlorosulfonated polyethylene (Hypolan 40). | 4.3 |
| 8 | 0.060 | 0.036 | 0.003 | 30% thermoplastic styrene/butadiene copolymer (Thermolastic −125). | 2.0 |
| 9 | 0.060 | 0.036 | 0.003 | 50% thermoplastic styrene/butadiene copolymer (Pharos 104). | 3.3 |
| 10 | 0.060 | 0.036 | 0.010 | 18% thermoplastic styrene/butadiene copolymer (Thermolastic −125). | 1.8 |
| 11 | 0.060 | 0.036 | 0.010 | 20% ethylene/propylene/diene nomomer (EPDM) (Nordel 1040). | 1.8 |
| 12 | 0.060 | 0.036 | 0.010 | 20% chlorosulfonated polyethylene (Hypalon 40). | 1.9 |
| 13 | 0.060 | 0.036 | 0.010 | 20% polybutadiene. | 1.9 |
| 14 | 0.060 | 0.036 | 0.010 | 20% polyisobutylene (Vistanex L−100). | 2.1 |
| 15 | 0.060 | 0.036 | 0.010 | 20% polyisobutylene (Vistanex LM-MH). | 2.3 |
| 16 | 0.060 | 0.036 | 0.010 | 50% thermoplastic-styrene/butadiene copolymer (Pharos 103). | 2.4 |
| 17 | 0.060 | 0.036 | 0.010 | 40%* polyurethane A. | 2.5 |

*Cured prior to blending with acidic copolymer.

the base panel 12 and constraining sheet 14 are laminated together into a constrained layer damped structure by a composite interlayer 30 comprising a layer 32 of the same visco-elastic polymer used to form the dispersed phase of particles 20 of the embodiment of FIG. 2 sandwiched between two layers 34 of the acidic copolymer used to form the continuous phase 22 of the embodiment of FIG. 2. The layers 34 are generally of film thickness, e.g., 0.5 to 3 mils thick and act as an adhesive between the base panel 12 and constraining sheet 14 and the corresponding surface of layer 32. The structure of Damping results at 25° C. temperatures for constrained layer damped composite structures at different interlayer thicknesses are shown in Table II. Polyurethane B is prepared and cured according to the procedure of Example 1 of the Ahramjian and Yin patent application and consists of 3.0 moles of toluene diisocyanate, 1.0 mole of polypropyleneether glycol (M.V. 1000), 1.5 moles 1–3, butane diol, and 0.2 mole of trimethylolpropane. The interlayers containing visco-elastic polymer provide much better damping results at the same thickness as the interlayer of acidic copolymer alone.

TABLE II

Base Panel = .060 in. steel
Constraining layer = .036 in. steel

| Example | Interlayer composition | Interlayer thickness, inches | Percent critical damping 100 C/Co at 25° C. |
|---|---|---|---|
| 18 | Acidic copolymer, no visco-elastic polymer | .010<br>.030 | 1.3<br>1.5 |
| 19 | Acidic copolymer with 40% polyisobutylene as dispersed phase | .010<br>.030 | 2.4<br>2.1 |
| 20 | Acidic copolymer with 50% polyurethane B as dispersed phase | .010<br>.030 | 2.1<br>3.5 |
| 21 | Acidic copolymer with 67% polyurethane B as dispersed phase | .010<br>.030 | 3.7<br>5.5 |

EXAMPLE 22

Following the procedure of Example 1, a constrained layer damped structure was made from a steel panel base 0.060 inch thick, a steel constraining sheet 0.036 inch thick and an interlayer .010 inch thick of a copolymer of ethylene/acrylic acid (9 percent acid) available as Dow PZ 4333–9 containing 50 percent by weight as a dispersed phase of polyurethane B. The structure had a percent critical damping at 25° C. of 2.4 as compared to 1.4 for the same structure in which the interlayer consisted solely of the acidic copolymer.

EXAMPLE 23

The previous example was repeated except that the acidic copolymer was ethylene/methacrylic acid (12 percent acid) having a melt index of 8, prepared according to the procedure of British Pat. No. 963,380. The structure had a percent critical damping at 25° C. of 3.1 as compared to 1.4 for the same structure in which the interlayer consisted solely of the acidic copolymer.

EXAMPLE 24

Following the procedure of Example 1, a constrained layer damped structure was made from a steel base panel 0.060 inch thick, a steel constraining sheet 0.036 inch thick, and an interlayer 0.014 inch thick, this interlayer being of the composite layered construction of FIG. 3 instead of the interlayer type of FIG. 1. The interlayer consisted of a layer of Polyurethane C 0.010 inch thick sandwiched between two films of 0.002 inch thickness each of the acidic copolymer of Example 1. The heating step for bonding the structure together was done on the assembly of panel, sheet, films and layer of visco-elastic polymer. The resultant structure had a percent critical damping at 25° C. of 13.0. Polyurethane C is prepared and according to the procedure of Example 1 of the Ahramjian and Yin patent application and consists of 2.4 moles of toluene diisocyanate, 1.0 mole polypropyleneether glycol (M.W. 1000), 1.05 moles 1,3-butane diol and 0.14 mole trimethololpropane.

EXAMPLE 25

Examples 17 and 22 were repeated, except that the interlayer was 0.002 inch thick, to illustrate the utility of the interlayer in film form as an adhesive. However, some damping was obtained using this thickness of interlayer.

As many apparently widely different embodiments of this invention may be made without departing from the spirit and scope thereof, it is to be understood that this invention is not limited to the specific embodiments thereof except as defined in the appended claims.

I claim:
1. A film of a dispersion of pre-cured polyurethane having a loss tangent of at least 0.5 in a copolymer of ethylene with from 5 to 25 percent by weight of an $a,\beta$-monomethylenically unsaturated carboxylic acid, the pre-cured polyurethanes constituting 10 to 80 percent based on the total weight of polymer in the film.

2. The film of claim 1 having a thickness of 3 to 25 mils.

3. The film of claim 1 wherein said polyurethane is made by reacting an amount W in parts by weight of an aromatic diisocyanate of molecular weight up to about 300, wherein $$W = -A\left(\log_{10} f - \frac{T-25}{10}\right) + B$$

wherein A is between 4 and 7, B is between 40 and 70, $f$ is the frequency of applied vibration in cycles per second, and T is the temperature of use in ° C., with 100 parts by weight of polypropyleneether glycol of number average molecular weight between 750 and 2500 and an amount by weight of low molecular weight hydroxyl compound selected from the group consisting of aliphatic diol and aliphatic triol sufficient to react with 70 to 100 percent of the NCO groups in excess of those required to form a bis-urethane from each molecule of polypropyleneether glycol.

4. The film of claim 1 wherein the acid is partially neutralized by metal ions.

References Cited

UNITED STATES PATENTS

| 3,271,342 | 9/1966 | Kuhn | 260—859 |
| 3,427,192 | 2/1969 | Bolinger | 260—859 |
| 3,426,099 | 2/1969 | Freifeld | 260—859 |
| 3,350,362 | 10/1967 | Potts | 260—859 |
| 3,406,127 | 10/1968 | Alexander | 260—859 |

PAUL LIEBERMAN, Primary Examiner

U.S. Cl. X.R.

161—190; 260—37 N, 41 A, 41 B, 41 R, 41 AG, 77.5 R